(12) United States Patent
Wang et al.

(10) Patent No.: US 12,194,722 B2
(45) Date of Patent: Jan. 14, 2025

(54) NONWOVEN FABRIC HAVING HIGH THERMAL RESISTANCE AND BARRIER PROPERTIES

(71) Applicant: Berry Global, Inc., Evansville, IN (US)

(72) Inventors: Lei Wang, Mooresville, NC (US); Nyle Bishop, Mooresville, NC (US); Jonathan T. Nix, Mount Juliet, TN (US); Zhang Tianlei, Weifang (CN); Jin Yongji, Shanghai (CN); Gao Junying, Suzhou (CN)

(73) Assignee: BERRY GLOBAL, INC., Evansville, IN (US)

( * ) Notice: Subject to any disclaimer, the term of this patent is extended or adjusted under 35 U.S.C. 154(b) by 304 days.

(21) Appl. No.: 17/093,997

(22) Filed: Nov. 10, 2020

(65) Prior Publication Data

US 2021/0146652 A1    May 20, 2021

Related U.S. Application Data

(60) Provisional application No. 62/936,826, filed on Nov. 18, 2019.

(51) Int. Cl.
*B32B 5/02* (2006.01)
*B32B 5/26* (2006.01)
(Continued)

(52) U.S. Cl.
CPC ............... *B32B 5/022* (2013.01); *B32B 5/26* (2013.01); *B32B 7/12* (2013.01); *D04H 1/559* (2013.01);
(Continued)

(58) Field of Classification Search
CPC ....... B32B 5/022; B32B 5/26; B32B 2250/20; B32B 2262/0253; D04H 1/559
See application file for complete search history.

(56) References Cited

U.S. PATENT DOCUMENTS

| 4,536,361 A | 8/1985 | Torobin |
| 5,183,670 A | 2/1993 | Trudeau |

(Continued)

FOREIGN PATENT DOCUMENTS

| CN | 104619901 A | 5/2015 |
| EP | 0674035 A2 | 9/1995 |

(Continued)

OTHER PUBLICATIONS

Third Written Opinion issued in corresponding international application No. PCT/US2020/059813 on Jan. 17, 2022, all enclosed pages cited.

(Continued)

*Primary Examiner* — Joanna Pleszczynska
(74) *Attorney, Agent, or Firm* — BURR & FORMAN LLP

(57) ABSTRACT

Nonwoven fabrics including a first outermost spunbond layer, a second outermost spunbond layer, and at least a first meltblown and/or melt-fibrillated layer disposed directly or indirectly between the first outermost spunbond layer and the second outermost spunbond layer. The first outermost spunbond layer comprises a first plurality of continuous fibers that are thermally fused and compacted against one another and define a microporous film on an outermost surface of the nonwoven fabric. The first plurality of continuous fibers comprises a first polymeric composition having a first melting point and the first meltblown layer and/or melt-fibrillated layer comprises a first plurality of meltblown fibers and/or melt-fibrillated fibers comprising a third polymeric composition having a third melting point, in which the first melting point is lower than the third melting point.

16 Claims, 2 Drawing Sheets

(51) Int. Cl.
  *B32B 7/12* (2006.01)
  *D04H 1/559* (2012.01)
  *D04H 3/007* (2012.01)
  *D04H 3/14* (2012.01)
  *D04H 13/00* (2006.01)

(52) U.S. Cl.
  CPC .............. *D04H 3/007* (2013.01); *D04H 3/14* (2013.01); *D04H 13/007* (2013.01); *B32B 2250/05* (2013.01); *B32B 2250/20* (2013.01); *B32B 2262/0253* (2013.01); *B32B 2307/7145* (2013.01); *B32B 2307/724* (2013.01); *B32B 2439/62* (2013.01)

(56) References Cited

U.S. PATENT DOCUMENTS

| | | | |
|---|---|---|---|
| 5,308,691 | A | 5/1994 | Lim et al. |
| 6,315,806 | B1 | 11/2001 | Torobin et al. |
| 6,382,526 | B1 | 5/2002 | Reneker |
| 6,520,425 | B1 | 2/2003 | Reneker et al. |
| 6,695,992 | B2 | 2/2004 | Reneker |
| 7,628,941 | B2 | 12/2009 | Krause et al. |
| 7,666,343 | B2 | 2/2010 | Johnson et al. |
| 7,722,347 | B2 | 5/2010 | Krause et al. |
| 7,790,641 | B2 | 9/2010 | Baker, Jr. et al. |
| 7,931,457 | B2 | 4/2011 | Johnson et al. |
| 8,512,626 | B2 | 8/2013 | Johnson et al. |
| 8,962,501 | B2 | 2/2015 | Johnson et al. |
| 2008/0139068 | A1 | 6/2008 | Yang et al. |
| 2015/0239204 | A1* | 8/2015 | Takebe ............... D04H 3/16 156/60 |
| 2018/0187352 | A1 | 7/2018 | Shirotani |

FOREIGN PATENT DOCUMENTS

| | | |
|---|---|---|
| EP | 2896731 A1 | 7/2015 |
| EP | 3511461 A1 | 7/2019 |
| WO | 2019094978 A1 | 5/2019 |
| WO | 2019116000 A1 | 6/2019 |

OTHER PUBLICATIONS

International Preliminary Report on Patentability issued in corresponding international application No. PCT/US2020/059813 on Mar. 16, 2022, all enclosed pages cited.

International Search Report and Written Opinion of corresponding international application No. PCT/US2020/059813 mailed on Mar. 1, 2021, all enclosed pages cited.

Office Action issued in corresponding Taiwanese Patent Application No. 109139202 on Sep. 7, 2021, all enclosed pages cited.

Second Written Opinion issued in corresponding international application No. PCT/US2020/059813 on Oct. 26, 2021, all enclosed pages cited.

Office Action issued in corresponding Taiwanese Patent Application No. 109139202 on Aug. 2, 2022, all enclosed pages cited.

Office Action issued in corresponding Argentine Patent Application No. P200103173 on Dec. 5, 2023, all enclosed pages cited.

Office Action issued in corresponding Taiwanese Patent Application No. 109139202 on Jun. 20, 2023, all enclosed pages cited.

* cited by examiner

NONWOVEN FABRIC HAVING HIGH THERMAL RESISTANCE AND BARRIER PROPERTIES

CROSS-REFERENCE TO RELATED APPLICATIONS

This application claims priority under 35 U.S.C. § 119 (e) to U.S. Provisional Application No. 62/936,826, filed Nov. 18, 2019, which is expressly incorporated by reference herein in its entirety.

TECHNICAL FIELD

Embodiments of the presently-disclosed invention relate generally to nonwoven fabrics generally having outer spunbond layers and one or more meltblown and/or melt-fibrillated layers located between the outer spunbond layers, in which the nonwoven fabrics may be suitable for use as a breathable barrier material in sterilized and/or serializable packages.

BACKGROUND

Medical packaging materials currently include medical-grade papers and nonwovens. One such nonwoven is Tyvek®, which is a nonwoven formed from flash spun high-density polyethylene (HDPE) fibers. Medical-grade papers can be steam sterilized (e.g., at temperature around 134° C. for about 6 min). Steam sterilization is frequently considered to be the most convenient and chemistry free sterilization method. Medical-grade papers, however, often exhibit higher particle lint, lower tear strength, lower breathability, and lower wet strength when compared to nonwovens, such as Tyvek®. For instance, Tyvek® provides a lower lint and higher air permeability alternative to medical-grade papers. Tyvek®, however, cannot be steam sterilized due to lower melting point of HDPE. In this regard, sterilization using Tyvek® must rely on chemical sterilization, such as ethylene oxide of hydrogen-peroxide-plasma sterilization.

Therefore, there remains a need in the art for nonwoven fabrics that may be utilized in a variety of packaging applications and a variety of sterilization modalities.

SUMMARY

One or more embodiments of the invention may address one or more of the aforementioned problems. Certain embodiments according to the invention provide nonwoven fabrics that include a first outermost spunbond layer comprising a first plurality of continuous fibers that are thermally fused and compacted against one another and define a microporous film (e.g., the first plurality of continuous fibers has been softened and at least partially flowed to form a microporous film structure) on an outermost surface of the nonwoven fabric. The first plurality of continuous fibers comprises a first polymeric composition having a first melting point. The nonwoven fabrics also comprise a second outermost spunbond layer comprising a second plurality of continuous fibers. In accordance with certain embodiments of the invention, the nonwoven fabrics may also comprise at least a first meltblown layer and/or melt-fibrillated layer comprising a first plurality of meltblown fibers and/or melt-fibrillated fibers located directly or indirectly between the first outermost spunbond layer and the second outermost spunbond layer. The first plurality of meltblown fibers and/or melt-fibrillated fibers comprise a third polymeric composition having a third melting point, in which the first melting point is lower than the third melting point.

In another aspect, the present invention provides a method of forming a nonwoven fabric. In accordance with certain embodiments of the invention, the method may comprise providing or forming a first outermost spunbond layer comprising a first plurality of continuous fibers, in which the first plurality of continuous fibers comprises a first polymeric composition having a first melting point. The method may further comprise depositing at least a first meltblown layer and/or melt-fibrillated layer comprising a first plurality of meltblown fibers and/or melt-fibrillated fibers located directly or indirectly onto the first outermost spunbond layer, in which the first plurality of meltblown fibers and/or melt-fibrillated fibers comprises a third polymeric composition having a third melting point that is higher than the first melting point. In accordance with certain embodiments of the invention, the method may also comprise providing or forming a second outermost spunbond layer comprising a second plurality of continuous fibers directly or indirectly onto the first meltblown layer and/or melt-fibrillated layer forming a precursor web, in which the first meltblown layer and/or melt-fibrillated layer is directly or indirectly located between the first outermost spunbond layer and the second outermost spunbond layer. The method may also comprise calendering the first outermost spunbond layer of the precursor web to compact the first plurality of continuous fibers against one another forming a substantially smooth outer surface in the form a microporous film that permits water vapor to pass therethrough while also serving as a barrier to bacteriological contamination.

In another aspect, the present invention provides a package. In accordance with certain embodiments of the invention, the package may include a sealed or sealable container comprising an interior defined at least in part by a container-wall, in which at least a portion of the sealed or sealable container comprises a breathable material, such as a nonwoven fabric as described and disclosed herein, through which a sterilizing gas, such as ethylene oxide, hydrogen-peroxide-plasma, or steam, can pass into and out of the interior of the sealed or sealable container.

In yet another aspect, the present disclosure provides a method of sterilizing a package comprising (i) providing a package as disclosed and described herein, (ii) placing the package in an air chamber; (iii) evacuating the air out of the air chamber and the package, (iv) filling the air chamber and package with a sterilizing gas, (v) allowing the sterilizing gas to remain within the air chamber and package for a pre-determined period of time, and (vi) evacuating the sterilizing gas.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1:
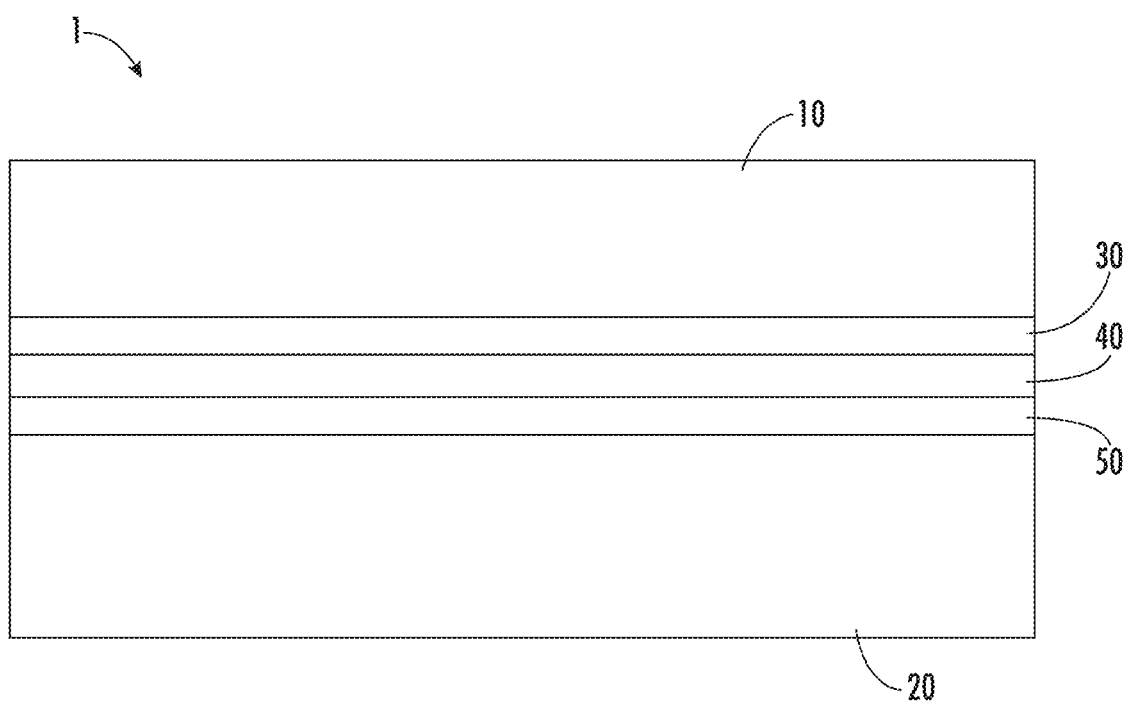
FIG. 1 illustrates a nonwoven fabric in accordance with certain embodiments of the invention.

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The presently-disclosed invention relates generally nonwoven fabrics including outermost spunbond layers and one or more meltblown and/or melt-fibrillated layers located between the outer spunbond layers, in which the nonwoven fabrics may be suitable for use as a breathable barrier material in sterilized and/or serializable packages. In accordance with certain embodiments of the invention, the nonwoven fabric may comprise a plurality of meltblown and/or melt-fibrillated layers located directly or indirectly between the two outermost spunbond layers. In accordance with certain embodiments of the invention, the nonwoven fabric includes multiple meltblown and/or melt-fibrillated layers having fine fibers relative to the outermost spunbond layers. In accordance with certain embodiments of the invention, the meltblown and/or melt-fibrillated layers may be formed from a polymeric composition having a significantly higher melt-flow-rate (MFR) compared to that used to form the outermost spunbond layers. In accordance with certain embodiments of the invention the melting point of one or both of the outermost spunbond layers is less than the melting point of the meltblown and/or melt-fibrillated layers as discussed below. In this regard, the one or both of the outermost spunbond layers can be melted (e.g. soften and flow via a smooth calendering operation) to form a microporous film structure on at least one of the outermost surfaces of the nonwoven fabric while preferably not melting (e.g., soften and flow) the fibers of the meltblown and/or melt-fibrillated layers. In this regard, the nonwoven fabric may provide barrier properties while simultaneously maintaining vapor breathability.

The terms "substantial" or "substantially" may encompass the whole amount as specified, according to certain embodiments of the invention, or largely but not the whole amount specified (e.g., 95%, 96%, 97%, 98%, or 99% of the whole amount specified) according to other embodiments of the invention.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material. The term "polymer" or "polymeric" shall also include polymers made from various catalyst systems including, without limitation, the Ziegler-Natta catalyst system and the metallocene/single-site catalyst system. The term "polymer" or "polymeric" shall also include, in according to certain embodiments of the invention, polymers produced by fermentation process or biosourced.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, meltblowing processes, spunbonding processes, needle-punching, hydroentangling, air-laid, and bonded carded web processes. A "nonwoven web", as used herein, may comprise a plurality of individual fibers that have not been subjected to a consolidating process.

The term "layer", as used herein, may comprise a generally recognizable combination of similar material types and/or functions existing in the X-Y plane.

The term "multi-component fibers", as used herein, may comprise fibers formed from at least two different polymeric materials or compositions (e.g., two or more) extruded from separate extruders but spun together to form one fiber. The term "bi-component fibers", as used herein, may comprise fibers formed from two different polymeric materials or compositions extruded from separate extruders but spun together to form one fiber. The polymeric materials or polymers are arranged in a substantially constant position in distinct zones across the cross-section of the multi-component fibers and extend continuously along the length of the multi-component fibers. The configuration of such a multi-component fiber may be, for example, a sheath/core arrangement wherein one polymer is surrounded by another, an eccentric sheath/core arrangement, a side-by-side arrangement, a pie arrangement, or an "islands-in-the-sea" arrangement, each as is known in the art of multicomponent, including bicomponent, fibers.

The term "machine direction" or "MD", as used herein, comprises the direction in which the fabric produced or conveyed. The term "cross-direction" or "CD", as used herein, comprises the direction of the fabric substantially perpendicular to the MD.

As used herein, the term "continuous fibers" refers to fibers which are not cut from their original length prior to being formed into a nonwoven web or nonwoven fabric. Continuous fibers may have average lengths ranging from greater than about 15 centimeters to more than one meter, and up to the length of the web or fabric being formed. For example, a continuous fiber, as used herein, may comprise a fiber in which the length of the fiber is at least 1,000 times larger than the average diameter of the fiber, such as the length of the fiber being at least about 5,000, 10,000, 50,000, or 100,000 times larger than the average diameter of the fiber.

As used herein, the term "aspect ratio", comprise a ratio of the length of the major axis to the length of the minor axis of the cross-section of the fiber in question.

The term "spunbond", as used herein, may comprise fibers which are formed by extruding molten thermoplastic material as filaments from a plurality of fine, usually circular, capillaries of a spinneret with the diameter of the extruded filaments then being rapidly reduced. According to an embodiment of the invention, spunbond fibers are generally not tacky when they are deposited onto a collecting surface and may be generally continuous as disclosed and described herein. It is noted that the spunbond used in certain composites of the invention may include a nonwoven described in the literature as SPINLACE®.

The term "meltblown", as used herein, may comprise fibers formed by extruding a molten thermoplastic material through a plurality of fine die capillaries as molten threads or filaments into converging high velocity, usually hot, gas (e.g. air) streams which attenuate the filaments of molten thermoplastic material to reduce their diameter, which may be to microfiber diameter, according to certain embodiments of the invention. According to an embodiment of the invention, the die capillaries may be circular. Thereafter, the meltblown fibers are carried by the high velocity gas stream and are deposited on a collecting surface to form a web of randomly disbursed meltblown fibers. Meltblown fibers may comprise microfibers which may be continuous or discontinuous and are generally tacky when deposited onto a collecting surface. Meltblown fibers, however, are shorter in length than those of spunbond fibers.

The term "melt fibrillation", as used herein, may comprise a general class of making fibers defined in that one or more polymers are molten and may be extruded into many possible configurations (e.g. co-extrusion, homogeneous or bicomponent films or filaments) and then fibrillated or fiberized into a plurality of individual filaments for the formation of melt-fibrillated fibers. Non limiting examples of melt-fibrillation methods may include melt blowing, melt fiber bursting, and melt film fibrillation. The term "melt-film fibrillation", as used herein, may comprise a method in which a melt film is produced from a melt and then a fluid is used to form fibers (e.g., melt-film fibrillated fibers) from the melt film. Examples include U.S. Pat. Nos. 6,315,806, 5,183,670, 4,536,361, 6,382,526, 6,520,425, and 6,695,992, in which the contents of each are incorporated by reference herein to the extent that such disclosures are consistent with the present disclosure. Additional examples include U.S. Pat. Nos. 7,628,941, 7,722,347, 7,666,343, 7,931,457, 8,512,626, and 8,962,501, which describe the Arium™ melt-film fibrillation process and melt-film fibrillated fibers formed therefrom, and the contents of each are incorporated by reference herein to the extent that such disclosures are consistent with the present disclosure.

All whole number end points disclosed herein that can create a smaller range within a given range disclosed herein are within the scope of certain embodiments of the invention. By way of example, a disclosure of from about 10 to about 15 includes the disclosure of intermediate ranges, for example, of: from about 10 to about 11; from about 10 to about 12; from about 13 to about 15; from about 14 to about 15; etc. Moreover, all single decimal (e.g., numbers reported to the nearest tenth) end points that can create a smaller range within a given range disclosed herein are within the scope of certain embodiments of the invention. By way of example, a disclosure of from about 1.5 to about 2.0 includes the disclosure of intermediate ranges, for example, of: from about 1.5 to about 1.6; from about 1.5 to about 1.7; from about 1.7 to about 1.8; etc.

In one aspect, the invention provides nonwoven fabrics that include a first outermost spunbond layer comprising a first plurality of continuous fibers that are thermally fused and compacted against one another and define a microporous film (e.g., the first plurality of continuous fibers has been softened and at least partially flowed to form a microporous film structure) on an outermost surface of the nonwoven fabric. The first plurality of continuous fibers comprises a first polymeric composition having a first melting point. The nonwoven fabrics also comprise a second outermost spunbond layer comprising a second plurality of continuous fibers. In accordance with certain embodiments of the invention, the nonwoven fabrics may also comprise at least a first meltblown layer and/or melt-fibrillated layer comprising a first plurality of meltblown fibers and/or melt-fibrillated fibers located directly or indirectly between the first outermost spunbond layer and the second outermost spunbond layer. The first plurality of meltblown fibers and/or melt-fibrillated fibers comprise a third polymeric composition having a third melting point, in which the first melting point is lower than the third melting point. In accordance with certain embodiments of the invention, the microporous film structure, which may be formed by the at least partial softening and flowing of the first plurality of continuous fibers to form the microporous film structure, permits water vapor to be transmitted through the nonwoven fabric while at least partially preventing penetration of the nonwoven fabric by a polar liquid and/or microbial penetration. The microporous film structure, for example, may be defined by the at least partial melting and flowing of at least a portion of the first plurality of continuous fibers on at least one of the outermost surfaces of the nonwoven fabric, such as via thermal area bonding. In accordance with certain embodiments of the invention, for example, the first polymeric composition of the first plurality of continuous fibers has softened and flowed to form the microporous film on at least one outermost surface of the nonwoven fabric. In this regard, certain embodiments in accordance with the invention provide a breathable material (e.g., breathable barrier material) in the form of a nonwoven fabric.

In accordance with certain embodiments of the invention, the first melting point of the first polymeric composition is at least about 1° C. to about 30° C. less than the third melting point of the third polymeric composition, such as at most about any of the following: 30° C., 25° C., 20° C., 15° C., and 10° C. less than the third melting point and/or at least about any of the following: 1° C., 2° C., 3° C., 4° C., 5° C., 6° C., 7° C., 8° C., 9° C., and 10° C. less than the third melting point. In this regard, for instance, one or both of the outermost spunbond layers may be at least partially softened and flowed to form a microporous film on one or both of the outermost surfaces of the nonwoven fabric, while the at least first meltblown layer and/or melt-fibrillated layer formed from the third polymeric composition does not soften and flow. In this regard, the at least first meltblown layer and/or melt-fibrillated layer formed from the third polymeric composition substantially retain their cross-sectional shape (e.g., substantially round). In accordance with certain embodiments of the invention, the outermost spunbond layers may be melted and flowed to form microporous film structures on at least the outermost surfaces of the nonwoven fabric while the internal meltblown and/or melt-fibrillated layer or layers are not subjected to softening and flowing. In this regard, the first outermost spunbond layer and the second outmost spunbond layer may each define a sheath component that protects the internal meltblown and/or melt-fibrillated layer or layers (e.g., mitigates against formation of lint). In this regard, the internal meltbown and/or melt-fibrillated layer or layers may have a less degree of bonding as compared to one or both of the outermost spunbond layers. In accordance with certain embodiments of the invention, the second polymeric composition has a second melting point that is lower than the third melting point. The second melting point may be identical or different than the first melting point in accordance with certain embodiments of the invention.

FIG. 1, for instance, illustrates a nonwoven fabric 1 in accordance with certain embodiments of the invention. The nonwoven fabric 1 includes a first outermost spunbond layer 10 and a second outermost spunbond layer 20. The nonwoven fabric shown in FIG. 1 includes three (3) internal meltblown and/or melt-fibrillated nonwoven layers 30, 40, 50. As noted above, one or both of the outermost spunbond layers 10, 20 may be subjected to, for example, smooth thermal calendering (e.g., area bonded) under conditions such that at least a portion of the outermost surfaces of the nonwoven fabric soften and flow to form microporous film structures, while the internal nonwoven layers substantially retain their individual fiber structures.

Figure 2:
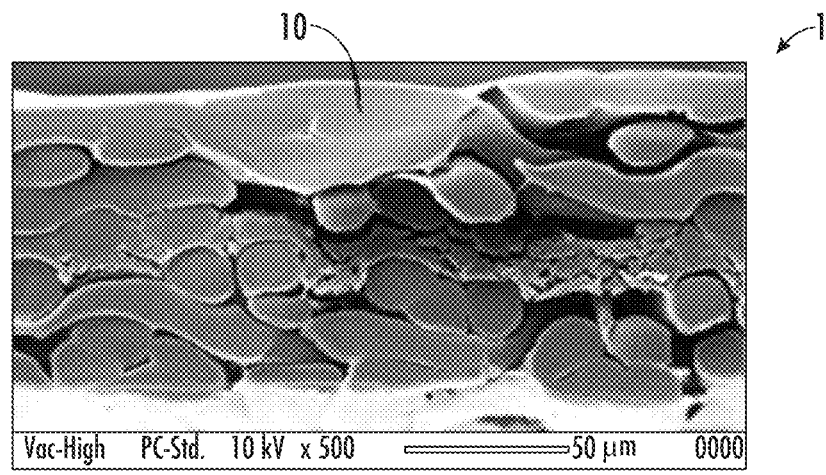
FIG. 2 shows a cross-sectional magnified image of a nonwoven fabric in accordance with certain embodiments of the invention.

FIG. 2, for instance, shows a cross-sectional magnified image of a nonwoven fabric 1 in accordance with certain embodiments of the invention. FIG. 2 shows the first outermost spunbond layer 10 that has been softened and flowed to form a microporous film structure. FIG. 2 also shows internal layers of meltblown layers that have substantially retained their individual fiber structure (e.g., individual fibers forming the layer are visually discernable).

In accordance with certain embodiments of the invention, the first polymeric composition may comprise a first polyolefin composition. For example, the first polyolefin composition may comprise a first polypropylene, a first polyethylene, a first polypropylene copolymer, a first polyethylene copolymer, or combinations thereof. As noted above, the first polyolefin composition may include polymers made from various catalyst systems including, without limitation, the Ziegler-Natta catalyst system and the metallocene/single-site catalyst system. For example, the first polymeric composition may comprise a first single-site catalyzed polypropylene (metallocene catalyzed polypropylene). In accordance with certain embodiments of the invention, the second plurality of continuous fibers may comprise a second polymeric composition, in which the second polymeric composition may be the same or different than the first polymeric composition. In this regard, the second polymeric composition may comprise a second polyolefin composition. For example, the second polyolefin composition may comprise a second polypropylene, a second polyethylene, a second polypropylene copolymer, a second polyethylene copolymer, or combinations thereof. As noted above, the second polyolefin composition may include polymers made from various catalyst systems including, without limitation, the Ziegler-Natta catalyst system and the metallocene/single-site catalyst system. For example, the second polymeric composition may comprise a second single-site catalyzed polypropylene (metallocene catalyzed polypropylene).

In accordance with certain embodiments of the invention, the third polymeric composition may comprise a third polyolefin composition. For example, the third polyolefin composition may comprise a third polypropylene, a third polyethylene, a third polypropylene copolymer, a third polyethylene copolymer, or combinations thereof. As noted above, the third polyolefin composition may include polymers made from various catalyst systems including, without limitation, the Ziegler-Natta catalyst system and the metallocene/single-site catalyst system. For example, the third polymeric composition may comprise a third single-site catalyzed polypropylene (metallocene catalyzed polypropylene). In accordance with certain embodiments of the invention, the third melting point has a higher value than both the first melting point and the second melting point. In accordance with certain embodiments of the invention, the first melting point and/or the second melting point may be less than 150° C. and the third melting point may be greater than 150° C.

The nonwoven fabric, in accordance with certain embodiments of the invention, may comprise one of the following structures:

$$S1_a\text{-}M_b\text{-}S2_c \quad \text{(Formula 1)}$$

wherein;
'M' comprises a meltblown nonwoven and/or melt-fibrillated nonwoven;
'S1' comprises a first spunbond nonwoven;
'S2' comprises a second spunbond nonwoven;
'a' represents the number of layers and is independently selected from 1, 2, 3, 4, and 5;
'b' represents the number of layers is independently selected from 1, 2, 3, 4, and 5; and
'c' represents the number of layers is independently selected from 1, 2, 3, 4, and 5; wherein 'S1' includes the first outermost spunbond layer, 'S2' includes the second outermost spunbond layer, and 'M' includes the first meltblown layer and/or melt-fibrillated layer.

In accordance with certain embodiments of the invention, for example, the nonwoven fabric may have a structure according to Formula 1 wherein 'a' is 1; 'b' is 3; and 'c' is 1.

In this regard, certain embodiments of the invention comprise a SMS, as discussed above, in which the meltblown fibers and/or melt-fibrillated fibers are directly or indirectly sandwiched between outer layers of spunbond fibers. In accordance with certain embodiments of the invention, the SMS nonwoven fabric may be calendered (e.g., smooth surface calendered) as discussed above to densely pack the continuous fibers of the spunbond layers and to form a microporous film structure on a least one outermost surface of the nonwoven fabric. In accordance with certain embodiments of the invention, the meltblown fibers and/or melt-fibrillated fibers may comprise one or more polyolefins or non-polyolefins (e.g., PET).

In accordance with certain embodiments of the invention, the first plurality of meltblown fibers and/or melt-fibrillated fibers may comprise an average diameter from about 0.4 to about 5 microns, such as at least about any of the following: 0.4, 0.5, 0.6, 0.7, 0.8, 0.9, and 1 microns and/or at most about any of the following: 5, 4, 3, 2.5, 2, 1.5, 1.2, 1.1, and 1 microns. In accordance with certain embodiments of the invention, the first plurality of meltblown fibers and/or melt-fibrillated fibers may comprise a substantially non-deformed configuration. For example, the first plurality of meltblown fibers and/or melt-fibrillated fibers may have a generally round cross-section with an aspect ratio from at least 0.8 to 1.2, such as 1.0+/−0.1. In accordance with certain embodiments of the invention, the first plurality of melt-fibrillated fibers comprises melt-film-fibrillated fibers.

In accordance with certain embodiments of the invention, the first plurality of continuous fibers (e.g., spunbond fibers) and/or the second plurality of continuous fibers (e.g., spunbond fibers) may comprise an average diameter prior to partial softening and melting (e.g., present in a precursor web as discussed below) from about 10 to about 30 microns, such as at least about any of the following: 10, 12, 14, 16, 18, 20, and 22 microns and/or at most about any of the following: 30, 28, 26, 24, 22, 20, 18, and 16 microns. In accordance with certain embodiments of the invention, the first plurality of continuous fibers (e.g., spunbond fibers) and/or the second plurality of continuous fibers (e.g., spunbond fibers) may comprise mono-component fiber or multicomponent fibers (e.g., bi-component sheath-core fibers in which at least the sheath component comprises the first polymeric material). In accordance with certain embodiments of the invention, the first plurality of continuous fibers (e.g., spunbond fibers) and/or the second plurality of continuous fibers (e.g., spunbond fibers) may comprise a non-round cross-section, such as having an aspect ratio of 1.5 or greater. Alternatively, the first plurality of continuous fibers (e.g., spunbond fibers) and/or the second plurality of continuous fibers (e.g., spunbond fibers) may comprise a generally round cross-section with an aspect ratio from at least 0.8 to 1.2, such as 1.0+/−0.1.

The nonwoven fabric, in accordance with certain embodiments of the invention, may comprise from about 1 to about 50% by weight of meltblown fibers and/or melt-fibrillated fibers, such as at least about any of the following: 1, 2, 3, 4, 5, 8, 10, 12, 15, 20, and 25% by weight of the nonwoven fabric is meltblown fibers and/or melt-fibrillated fibers, and/or at most about any of the following: 50, 45, 40, 35, 30, 25, 20, 15, 12, 10, and 5% by weight of the nonwoven fabric is meltblown fibers and/or melt-fibrillated fibers.

The first polymeric composition, in accordance with certain embodiments of the invention, may comprise a first melt-flow-rate (MFR) and the third polymeric composition may comprise a third MFR, wherein the third MFR is larger than the first MFR. For instance, a MFR ratio between the third MFR and the first MFR (third MFR:first MFR) may comprise from about 20:1 to about 150:1, such as at least about any of the following: 20:1, 30:1, 40:1, 50:1; 60:1, and 70:1 and/or at most about any of the following: 150:1, 140:1, 130:1, 120:1, 110:1, 100:1, 90:1, 80:1, 70:1, and 60:1. In accordance with certain embodiments of the invention, the third MFR may comprise from about 1000 dg/min to about 2500 dg/min, such as from at least about any of the following: 1000, 1200, 1400, 1600, and 1800 dg/min and/or from at most about any of the following: 2500, 2400, 2200, 2000, and 1800 dg/min. In accordance with certain embodiments of the invention, the first MFR and/or the second MFR (i.e., the MFR for the second polymeric composition) may comprise from about 10 dg/min to about 150 dg/min, such as from at least about any of the following: 10, 15, 20, 25, and 30 dg/min and/or from at most about any of the following: 150, 125, 100, 75, 50, 40, and 30 dg/min.

In accordance with certain embodiments of the invention, the nonwoven fabric may comprise a thickness in a z-direction that is perpendicular to a machine direction and a cross-direction, the thickness comprises from about 100 microns to about 200 microns, such as from at least about any of the following: 100, 110, 120, 130, 140, and 150 microns and/or from at most about any of the following: 200, 190, 180, 175, 170, 160, and 150 microns.

In accordance with certain embodiments of the invention, the nonwoven fabric may comprise a hydrostatic head from about 100 to about 250 mbar as determined by AATCC™ 127, such as from at least about any of the following: 100, 110, 120, 130, 140, and 150 mbar as determined by AATCC™ 127 and/or from at most about any of the following: 250, 225, 200, 175, 170, 160, and 150 as determined by AATCC™ 127. The nonwoven fabric, in accordance with certain embodiments of the invention, may comprise a hydrostatic head-to-thickness ratio (hydrostatic head in mbar as determined by AATCC™ 127:thickness in microns) from about 0.8:1 to about 2:1, such as from at least about any of the following: 0.8:1, 0.9:1, 1:1, 1.1:1, 1.15:1, 1.2:1, 1.25:1, and 1.3:1 and/or from at most about any of the following: 2:1, 1.9:1, 1.8:1, 1.7:1, 1.6:1, 1.5:1, 1.4:1, and 1.3:1.

In accordance with certain embodiments of the invention, the nonwoven fabric may comprise an air permeability of about 300 to about 1000 ml/dm$^2$/min as determined by ASTM D737-75, such as from at least about any of the following: 300, 400, 500, 550, 600, and 650 ml/dm$^2$/min as determined by ASTM D737-75 and/or from at most about any of the following: 1000, 900, 800, 700, 650, and 600 ml/dm$^2$/min as determined by ASTM D737-75. The nonwoven fabric, in accordance with certain embodiments of the invention, may comprise an air-permeability-to-thickness ratio (air permeability in ml/dm$^2$/min as determined by ASTM D737-75:thickness in microns) from about 2.5:1 to about 5:1, such as from at least about any of the following: 2.5:1, 2.75:1, 3:1, 3.25:1, 3.5:1, 3.75:1, and 4:1 and/or from at most about any of the following: 5:1, 4.5:1, 4:1, 3.5:1, and 3:1.

In accordance with certain embodiments of the invention, the nonwoven fabric may comprise a machine direction Elmendorf Tear value from about 4 to about 10 N as determined by ASTM D1424-EN21974, such as from at least about any of the following: 4, 4.5, 5, 5.5, 6, and 6.5 N as determined by ASTM D1424-EN21974 and/or from at most about any of the following: 10, 9, 8, 7, and 6.5 N' as determined by ASTM D1424-EN21974. In accordance with certain embodiments of the invention, the nonwoven fabric may comprise a cross-direction Elmendorf Tear value from about 5 to about 20 N as determined by ASTM D1424-EN21974, such as from at least about any of the following: 5, 6, 7, 8, 9, and 10 N as determined by ASTM D1424-EN21974 and/or from at most about any of the following: 20, 18, 16, 14, 12, and 10 N as determined by ASTM D1424-EN21974.

In accordance with certain embodiments of the invention, the nonwoven fabric may comprise a cross-direction Elmendorf Tear-to-thickness ratio (cross-direction Elmendorf Tear in N as determined by ASTM D1424-EN21974:thickness in microns) from about 1:8 to about 1:30, such as from at least about any of the following: 1:30, 1:25, 1:20, 1:18, and 1:15 and/or from at most about any of the following: 1:8, 1:9, 1:10, 1:11, 1:12, 1:13, 1:14, and 1:15.

In accordance with certain embodiments of the invention, the nonwoven fabric may comprise a water-vapor-transmission-rate (WVTR) from about 750 to about 2500 g/m$^2$/24 hour as determined by ASTM E96D, such as from at least about any of the following: 750, 800, 850, 900, 950, 1000, 1100, 1200, 1300, and 1400 g/m$^2$/24 hour as determined by ASTM E96D and/or from at most about any of the following: 2500, 2250, 2000, 1800, 1600, and 1500 g/m$^2$/24 hour as determined by ASTM E96D. In accordance with certain embodiments of the invention, the nonwoven fabric may comprise a WVTR-to-thickness ratio (WVTR in g/m$^2$/24 hour as determined by ASTM E96D:thickness in microns) from about 7:1 to about 20:1, such as from at least about any of the following: 7:1, 8:1, 9:1, 10:1, 11:1, and 12:1 and/or from at most about any of the following: 20:1, 18:1, 16:1, 15:1, 14:1, 13:1, and 12:1.

In accordance with certain embodiments of the invention, the nonwoven fabric may comprise a mean pore diameter that may comprise from about 1.5 to about 3 microns as determined by ASTM F316-86, such as from at least about any of the following: 1.5, 1.8, 2.0, 2.2, 2.5, and 2.5 microns as determined by ASTM F316-86 and/or from at most about any of the following: 3, 2.9, 2.8, 2.7, 2.6, 2.5, and 2.4 microns as determined by ASTM F316-86. In accordance with certain embodiments of the invention, the nonwoven fabric may comprise a maximum pore diameter that may comprise from about 3.5 to about 6 microns as determined by ASTM F316-86, such as from at least about any of the following: 3.5, 3.8, 4, 4.2, 4.3, 4.4, and 4.5 microns as determined by ASTM F316-86 and/or from at most about any of the following: 6, 5.8, 5.6, 5.4, 5.2, 5, 4.8, 4.6, and 4.5 microns as determined by ASTM F316-86. In accordance with certain embodiments of the invention, the maximum pore diameter may be no more than 2.8 microns larger than the average pore diameter, such as no more than 2.8, 2.7, 2.6, 2.5, 2.4, 2.3, 2.2, 2.1, 2, 1.8, or 1.6 microns larger than the average pore diameter.

In accordance with certain embodiments of the invention, the nonwoven fabric may comprise a Bacterial Filtration Efficiency (BFE) of at least 90% as determined by ASTM F2101-14, such from at least about any of the following: 90, 92, 94, 95, 96, 97, 98, or 99% as determined by ASTM F2101-14. In accordance with certain embodiments of the invention, the nonwoven fabric may comprise an Aerosol Spore Challenge Value (log reduction value or LRV) of greater than 3 LRV as determined by ASTM F1608.

The nonwoven fabric, in accordance with certain embodiments of the invention, may comprise a Lint Level of from no more than 1000 particles as determined by ISO 9073-10, such as no more than about 900, 800, 700, 600, 500, 400, and 300 particles as determined by ISO 9073-10.

The nonwoven fabric, in accordance with certain embodiments of the invention, may comprise a smooth calendered nonwoven fabric, such as at a nip pressure of about 1500 to about 3000 pounds per linear inch and at an elevated temperature such that the first polymeric composition has softened and flowed to form the microporous film.

In accordance with certain embodiments of the invention, that nonwoven fabric may comprise a basis weight from about 30 to about 200 grams-per-square-meter (GSM), such as from at least about any of the following: 200, 180, 160, 140, 120, 100, 80, and 60 gsm and/or at least about any of the following: 30, 40, 50, 60, 70, 80, and 90 gsm.

In another aspect, the present invention provides a method of forming a nonwoven fabric. In accordance with certain embodiments of the invention, the method may comprise providing or forming a first outermost spunbond layer comprising a first plurality of continuous fibers, in which the first plurality of continuous fibers comprises a first polymeric composition having a first melting point. The method may further comprise depositing at least a first meltblown layer and/or melt-fibrillated layer comprising a first plurality of meltblown fibers and/or melt-fibrillated fibers located directly or indirectly onto the first outermost spunbond layer, in which the first plurality of meltblown fibers and/or melt-fibrillated fibers comprises a third polymeric composition having a third melting point that is higher than the first melting point. In accordance with certain embodiments of the invention, the method may also comprise providing or forming a second outermost spunbond layer comprising a second plurality of continuous fibers directly or indirectly onto the first meltblown layer and/or melt-fibrillated layer forming a precursor web, in which the first meltblown layer and/or melt-fibrillated layer is directly or indirectly located between the first outermost spunbond layer and the second outermost spunbond layer. The method may also comprise calendering the first outermost spunbond layer of the precursor web to compact the first plurality of continuous fibers against one another forming a substantially smooth outer surface in the form a microporous film that permits water vapor to pass therethrough while also serving as a barrier to bacteriological contamination.

In accordance with certain embodiments of the invention, the step of calendering the first outermost spunbond layer comprises smooth calendering (e.g., area bonding) the first outermost spunbond layer at a nip pressure of about 1500 to about 3000 pounds per linear inch and at an elevated temperature such that the first polymeric composition softens and flows to form the microporous film. In this regard, the second outermost spunbond layer may also be subjected to a smooth calendering operation to provide a second microporous film on the second outermost surface of the nonwoven fabric. In accordance with such embodiments of the invention, both of the outermost surfaces of the nonwoven fabric comprise a microporous film structure formed from the softening and flowing of the respective continuous spunbond fibers.

In accordance with certain embodiments of the invention, the step of calendering the first outermost spunbond layer comprises raising the temperature the first plurality of continuous fibers to a calendering temperature that is (i) equal to or greater than the first melting point and (ii) less than the third melting point. In accordance with certain embodiments of the invention, the second outermost spunbond layer comprises raising the temperature of the second plurality of continuous fibers to a calendering temperature that is (i) equal to or greater than the second melting point and (ii) less than the third melting point.

In accordance with certain embodiments of the invention, the method may also comprise pre-bonding the precursor web prior to calendering (e.g., smooth calendering) the first outermost spunbond layer. For example, the step of pre-bonding the precursor web comprises imparting a bonded area from about 1% to about 30% of the precursor web prior to the secondary calendering (e.g., smooth calendering).

Figure 3:
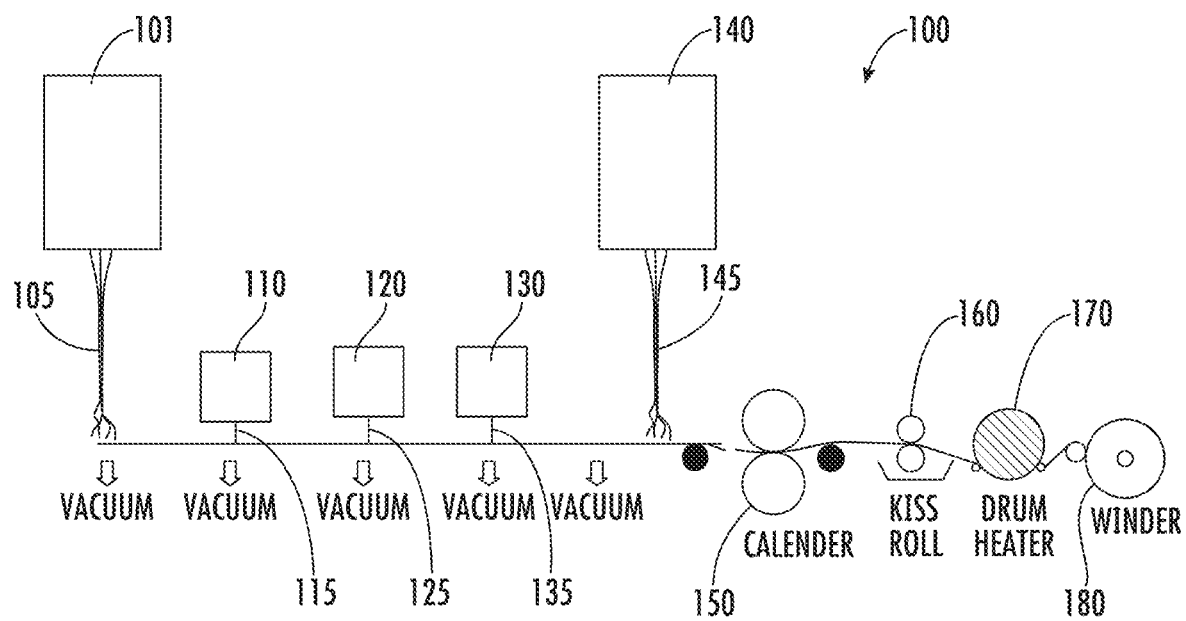
FIG. 3 illustrates a schematic for a method of producing a nonwoven fabric in accordance with certain embodiments of the invention.

FIG. 3, for instance, illustrates a schematic for a method 100 of producing a nonwoven fabric in accordance with certain embodiments of the invention. As shown in FIG. 3, a first spunbond beam 101 deposits a first plurality of continuous spunbond fibers 105, followed by three successive meltblown beams 110, 120, 130 each depositing a layer of meltblown fibers 115, 125, 135, respectively. Subsequently, a final beam being a spunbond beam 140 deposits a second plurality of continuous spunbond fibers 145 on top of the last deposited layer of meltblown fibers 135 to form a precursor web. The precursor web may then be pre-bonded by a thermal calender 150. Optionally, the precursor web may be surface treated with an additive (e.g., hydrophobic finish, etc) via a kiss roll applicator 160. The precursor web may then be subjected to a secondary thermal calendering step, such as a smooth calendering operation, 170 such that the first plurality of continuous fibers softens and flows to form a microporous film on a outermost surface of the nonwoven fabric. The resulting nonwoven fabric may be stored on a winder 180.

In another aspect, the present invention provides a package. In accordance with certain embodiments of the invention, the package may include a sealed or sealable container comprising an interior defined at least in part by a container-wall, in which at least a portion of the sealed or sealable container comprises a breathable material, such as a nonwoven fabric as described and disclosed herein, through which a sterilizing gas, such as ethylene oxide, hydrogen-peroxide-plasma, or steam, can pass into and out of the interior of the sealed or sealable container.

In accordance with certain embodiments of the invention, the package may comprise an adhesive disposed on the container-wall and/or on a portion of the breathable material. Alternatively, the package may be devoid of an adhesive.

In accordance with certain embodiments of the invention, the package may comprise a sealing film disposed on the container-wall and/or on a portion of the breathable material. The breathable material, for example, may be sealed to the container wall via the sealing film.

In accordance with certain embodiments of the invention, the package may comprise a flexible package and the breathable material may define a window portion of the flexible package. Alternatively, the package may comprise a rigid package and the breathable material defines a lid or flexible portion of the rigid package that can be peeled off.

In accordance with certain embodiments of the invention, the package includes an article, such as a medical device, disposed with the interior of the container. For example, the medical device may be sterile. In accordance with certain embodiments of the invention, an atmosphere within the interior of the container is substantially free of sterilizing gas.

In yet another aspect, the present disclosure provides a method of sterilizing a package comprising (i) providing a package as disclosed and described herein, (ii) placing the package in an air chamber; (iii) evacuating the air out of the air chamber and the package, (iv) filling the air chamber and package with a sterilizing gas, (v) allowing the sterilizing gas to remain within the air chamber and package for a pre-determined period of time, and (vi) evacuating the sterilizing gas. In accordance with certain embodiments of the invention, the sterilizing gas may comprise ethylene oxide, ethylene oxide and nitrogen, ethylene oxide and carbon dioxide, ethylene oxide with one or more chlorofluorocarbon diluents, ozone, hydrogen peroxide gas plasma, chlorine dioxide, moisture (e.g. steam), and mixtures thereof. In accordance with certain embodiments of the invention, steps (iii) through (vi) are repeated in sequence for a plurality of sterilizing cycles.

EXAMPLES

The present disclosure is further illustrated by then following examples, which in no way should be construed as being limiting. That is, the specific features described in the following examples are merely illustrative and not limiting.
Test Methods
Pore size: Pore size was measured by PMI Porometer and a 25 mm diameter sample holder was used. The pore size determination method PMI Automated Capillary Flow Porometer System follows ASTM F316-86/EN868-6-2017 Annex C.

WVTR: ASTM E96D—The Standard Test Methods for Water Vapor Transmission of Materials was used to evaluate WVTR. This test method covers the determination of water vapor transmission of materials through which the passage of water vapor, Procedure B at 50% relative humidity (RH) and 32° C. and is reported in grams-per-square meter per 24 hours (g/m²/24 hour).

Air Permeability: Air Permeability is a measure of air flow passing through a sheet under at a stated pressure differential between the surfaces of the sheet and was conducted according to ASTM D 737, Test area was 38 cm², Test Pressure was 125 Pa, and is reported in ml/dm²/min.

Wet Microbial Penetration: Testing for bacteria barrier property of germ proofness under humidity according to DIN 58953-6, section 3.8 test.—Sterile supply—Part 6: Microbial barrier testing of packaging materials for medical devices which are to be sterilized then tested for germ proofness in moisture. The Inventive Example material was tested for germ proofness under humidity after sterilized by steam (134° C./5 min) and by $H_2O_2$-plasma (Steriplas/50° C./2 injections) and was evaluated as "sufficiently germ-proof" according to DIN 58953-6, section 3.8.

Bacterial Filtration Efficiency (BFE): BFE was evaluated according to ASTM F2101-14 a Standard Test Method for Evaluating the Bacterial Filtration Efficiency (BFE) of Medical Materials, Using a Biological Aerosol of Staphylococcus aureus. The BFE test is performed to determine the filtration efficiency of test articles by comparing the bacterial control counts upstream of the test article to the bacterial counts downstream. A suspension of Staphylococcus aureus was aerosolized using a nebulizer and delivered to the test article at a constant flow rate and fixed air pressure. This test method complies with ASTM F2101-14, Annex B, and AS4381:2015.

Aerosol Spore Challenge (Exposure Chamber Method): Aerosol spore challenge was evaluated according to ASTM F1608, which is a standard test method for microbial ranking of porous packaging materials (Exposure chamber method). This test method is used to determine the passage of airborne bacteria through porous materials intended for use in packaging sterile medical devices. This test method is designed to test materials under conditions that result in the detectable passage of bacterial spores through the test material. The laboratory tested porous materials to determine the Log Reduction Value (LRV) Materials tested under the standard conditions. The Aerosol Spore Challenge (Exposure Chamber Method) ASTM F1608 test employs a low flow rate, extended exposure time, and increased challenge level, which allow testing of materials with high differential pressure values. All flow rates were at standard levels.

Gelbo Flex Linting: Testing for the linting of particles was conducted according to ISO 9073-10: Standard Test Method for Determining Lint and Other Particles Generated in the Dry State (Gelbo Flex). Test Articles (samples size: 22 cm wide×28.5 cm long) were subjected to a combined twisting and compression action in a test chamber using a Gelbo Flex mechanism. During the flexing, air was withdrawn from the chamber and the particulates generated were enumerated and sized using a laser particle counter. The particles size from 0.3 µm, 0.5 µm, 1.0 µm, 5.0 µm, 10.0 µm to 25 µm for each type of material were collected and countered.
Samples Comparative Sample 1: Tyvek® 1073B, which is a brand of nonwoven formed from flash-spun high-density polyethylene (HDPE) fibers. This sample material fiber has an average diameter of around 1.54 µm (0.66 microns to 2.54 microns).

Comparative Sample 2: Commercially available medical-grade papers were purchased and used as another comparative sample.

Inventive Example: The inventive sample material had a SMMMS structure and was made on a 5 beams production line (i.e., a Reicofil 4 line). The process to form the inventive sample comprised forming a first spunbond layer from beam 1 of continuous metallocene polypropylene filaments that were deposed on a moving forming surface, followed by forming three separated layers of meltblown fibers via beams 2, 3, 4 that were deposited on to the first spunbond layer. The meltblown fibers were formed from metallocene polypropylene having a higher melting point (i.e., 9° C. higher) than that of the first spunbond layer. Next, bean 5 was used to spin and deposit a second spunbond layer overlying the meltblown layers. The resulting precursor web (e.g., SMMMS web that has not been subjected to any consolidation operation) was then fed into the nip point of a calender (e.g., pre-bonded) and point bonded under pressure (i.e., 1080 N/cm and 165° C. temperature). The pre-bonded precursor web (i.e., Inventive Example 0 (base nonwoven)) was then were thermally bonded together with a smooth metal calender nip under a higher pressure of 1500 to 2500 pounds per lineal inch with temperature of 310° F. (154.40° C.) at 38 meter per minute line speed to provide the Inventive Example. The properties of this resulting nonwoven fabric are summarized in Table 1 below.

The Inventive Example used Metallocene PP spunbond and Metallocene PP melt-blown resin having different melt flow rates (MFR). That is, each of the spunbond layers were formed from metallocene polypropylene having a MFR 30 dg/min and each of the meltblown layer was formed from a metallocene polypropylene having a MFR of 1800 dg/min. The melting point of the polymeric composition forming each of the spunbond layers was 9° C. lower than the polymeric composition forming each of the meltblown layers. In this regard, the difference in melting point between the spunbond and meltblown layers enabled easier melting (e.g., softening and at least partial flowing) of the outside spunbond layers during a secondary calendering (e.g., smooth calendering imparting the microporous film structure) while maintaining the distinct finer fibers (e.g., not melted) in the center or core of the nonwoven fabric as illustrated, for example, in FIG. 2. In this regard, the inventive sample was able to maintain a desirable level of breathability. The total basis weight of the precursor web, which is identified as Inventive Example 0 (base nonwoven) in Table 1, was 76.8 g/m$^2$.

In the inventive sample each of the meltblown fibers of each of the meltblown layers had a round cross-section and an average diameter of 1.06 μm (0.33 microns to 3 microns) and the spunbond fibers of each spunbond layer had an average diameter of around 17.22 microns (15.84 microns to 20 microns). The first layer of continuous spunbond fibers for the precursor web (Inventive Example 0) was about 33.3 gsm, the sum of all three meltblown layers amounted to about 10.2 gsm, and the second layer of continuous spunbond fibers was about 33.3 gsm. The precursor web (Inventive Example 0) was pre-bonded with an embossing roll to provide a point-bonded bonding area of 18% of the surface of the nonwoven fabric.

Test result data summary for the precursor web (Inventive Example 0) and the Inventive Example compared to Comparative Sample 1 and Comparative Sample 2 are summarized in Table 1.

TABLE 1

| Physical Property | Test Method | Unit | Inventive Example 0 (Base) AVG | Inventive Example 1 AVG | 76 gsm Tyvek Comparative Sample 1 AVG | 124 gsm Medical Paper Comparative Sample 2 AVG |
|---|---|---|---|---|---|---|
| MD Strip Tensile | ASTM D5035 | N/in | 86.5 | 123 | 156.7 | 192.1 |
| MD Strip Elongation | ASTM D5035 | % | 48.7 | 32.46 | 17.3 | 5.4 |
| Hydrohead (60 mbar/min) - 3rd drop | AATCC TM 127 | mbar | 96.9 | 158 | 137.2 | 38.4 |
| Thickness | DIN EN 20534 | microns | 427.3 | 136.80 | 224.2 | 156.6 |
| Gurley Porosity | ISO 5636-5 | sec/100 cc | 0.0 | 28 | 28.8 | 171.7 |
| Air Permeability (Test area 38 cm 2, Test pressure 125 Pa) | ASTM D737-75 | ml/dm$^2$/min | 47680.0 | 538 | 453 | 143.4 |
| Elmendorf tear in MD | ASTM D1424-EN21974 | N | 13.4 | 6.5 | 2.7 | 0.9 |
| Elmendorf tear in CD | ASTM D1424-EN21974 | N | 19.6 | 10.9 | 3.7 | 1.3 |
| Basis Weight | DIN EN IS O 536 | g/m$^2$ | 76.8 | 71 | 76 | 124 |
| WVTR at 32° 50% RH (Water Vapor Transmission Rate) | ASTM E96D | g/m$^2$/24 hour | 1731.6 | 1402 | 1254 | 892 |
| Spencer Puncture | ASTM D3420 | J/m$^2$ | 60.0 | 5226 | 7384 | 2057 |
| Mean Pore Diameter | ASTM F316-86 and refer to EN868-6-2017 Annex C | microns | 4.3 | 2.18 | 2.82 | 3.64 |
| Maximum Pore Diameter | ASTM F316-86 and refer to EN868-6-2017 Annex C | microns | 10.4 | 4.32 | 6.14 | 6.03 |
| Bacterial Filtration Efficiency (BFE) | AST M F12101-14 | % | | 98.40 | | |
| Areosol Spore Challenge (Exposure Chamber Method) | ASTM F1608 | LRV | | 3.13 | | |
| Gelbo Flex Linting (Total Linting ≥0.3 μm) | ISO 9073-10 | Number of Particles | 385 | 502 | 2927 | 5851 |
| Gelbo Flex Linting (Total Linting ≥0.5 μm) | ISO 9073-10 | Number of Particles | 253 | 293 | 270 | 1988 |

As shown in Table 1, the inventive example had a smaller average pore size than medical-grade papers and Tyvek®. Also, the mean pore diameter was 29% smaller than 76 gsm Tyvek material and 67% smaller than medical paper. The maximum pore diameter of the inventive example was 42% lower than the 76 gsm Tyvek material and 40% lower than medical paper. In this regard, the inventive example had better uniformity and lower variation than both Tyvek and the medical paper.

In accordance with certain embodiments, such as the inventive example, the structure of the nonwoven fabric allows for vapor to pass through the nonwoven fabric while simultaneously providing sufficient and/or desirable barrier properties to bacterial and polar liquids (e.g., water, blood, etc.). Additionally, the inventive example illustrates that embodiments in accordance with certain embodiments of the invention provide a hydrostatic hydrohead that is higher than that of Tyvek® and high barrier properties (e.g., LRV>3).

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A nonwoven fabric, comprising:
(i) a first outermost spunbond layer comprising a first plurality of continuous fibers that are thermally fused and compacted against one another and define a microporous film on an outermost surface of the nonwoven fabric, the first plurality of continuous fibers comprises a first polymeric composition consisting of a single polymer, and wherein the first polymeric composition has a first melting point;
(ii) a second outermost spunbond layer comprising a second plurality of continuous fibers; and
(iii) (a) at least a first meltblown layer comprising a first plurality of meltblown fibers, (b) a first melt-fibrillated layer comprising a first plurality of melt-fibrillated fibers, or (c) both (a) and (b) located directly or indirectly between the first outermost spunbond layer and the second outermost spunbond layer, the first plurality of meltblown fibers, or the first plurality of melt-fibrillated fibers, or both comprise a third polymeric composition having a third melting point; wherein the first melting point is lower than the third melting point;
wherein the first outermost spunbond layer, the second outermost spunbond layer, or both comprise a thermally area-bonded layer at a nip pressure from 1500 to 3000 pounds per lineal inch, and wherein the nonwoven fabric has a hydrostatic head from about 100 to about 250 mbar as determined by AATCC TM 127.

2. The nonwoven fabric of claim 1, wherein the microporous film permits water vapor to be transmitted through the nonwoven fabric while at least partially preventing penetration of the nonwoven fabric by a polar liquid.

3. The nonwoven fabric of claim 1, wherein the first polymeric composition of the first plurality of continuous fibers has softened and flowed to form the microporous film.

4. The nonwoven fabric of claim 1, wherein the first melting point is at least about 1° C. to about 30° C. less than the third melting point.

5. The nonwoven fabric of claim 1, wherein the single polymer is a first polypropylene, a first polyethylene, a first polypropylene copolymer, or a first polyethylene copolymer.

6. The nonwoven fabric of claim 1, wherein the second plurality of continuous fibers comprise a second polymeric composition, the second polymeric composition being the same or different than the first polymeric composition.

7. The nonwoven fabric of claim 6, wherein the second polymeric composition has a second melting point, the second melting point is lower than the third melting point.

8. The nonwoven fabric of claim 1, wherein the first melting point is less than 150° C. and the third melting point is greater than 150° C.

9. The nonwoven fabric of claim 1, wherein the nonwoven fabric comprises one of the following structures:

$$S1_a\text{-}M_b\text{-}S2_c$$

wherein;
'M' comprises a meltblown nonwoven and/or melt-fibrillated nonwoven;
'S1' comprises a first spunbond nonwoven;
'S2' comprises a second spunbond nonwoven;
'a' represents the number of layers and is independently selected from 1, 2, 3, 4, and 5;
'b' represents the number of layers is independently selected from 1, 2, 3, 4, and 5; and
'c' represents the number of layers is independently selected from 1, 2, 3, 4, and 5;
wherein 'S1' includes the first outermost spunbond layer, 'S2' includes the second outermost spunbond layer, and 'M' includes the first meltblown layer and/or melt-fibrillated layer.

10. The nonwoven fabric of claim 9, wherein 'a' is 1; 'b' is 3; and 'c' is 1.

11. The nonwoven fabric of claim 1, wherein the first plurality of meltblown fibers, the first plurality of melt-fibrillated fibers, or both independently have an average diameter from about 0.4 to about 5 microns.

12. The nonwoven fabric of claim 1, wherein the first polymeric composition has a first melt-flow-rate (MFR) and the third polymeric composition has a third MFR; wherein the third MFR is larger than the first MFR.

13. The nonwoven fabric of claim 12, wherein a MFR ratio between the third MFR and the first MFR comprises from about 20:1 to about 150:1.

14. The nonwoven fabric of claim 1, wherein the a first plurality of meltblown fibers and/or the first plurality of melt-fibrillated fibers are individually discernable and have a substantially non-deformed configuration.

15. The nonwoven fabric of claim 1, wherein the nonwoven fabric includes at least one melt-fibrillated layer.

16. A nonwoven fabric, comprising:
(i) a first outermost spunbond layer comprising a first plurality of continuous fibers that are thermally fused and compacted against one another and define a microporous film on an outermost surface of the nonwoven fabric, the first plurality of continuous fibers comprises a first polymeric composition having a first melting point;
(ii) a second outermost spunbond layer comprising a second plurality of continuous fibers;
(iii) (a) at least a first meltblown layer comprising a first plurality of meltblown fibers, (b) a first melt-fibrillated layer comprising a first plurality of melt-fibrillated fibers, or (c) both (a) and (b) located directly or indirectly between the first outermost spunbond layer and the second outermost spunbond layer, the first plurality of meltblown fibers, or the first plurality of melt-fibrillated fibers, or both comprise a third polymeric composition having a third melting point, wherein the first melting point is lower than the third melting point;
wherein the first plurality of continuous fibers have a deformed configuration due to softening and at least partially flowing to form the microporous film, and wherein the first plurality of meltblown fibers and/or melt-fibrillated fibers have a substantially non-deformed configuration;

wherein the first outermost spunbond layer, the second outermost spunbond layer, or both comprise a thermally area-bonded layer at a nip pressure from 1500 to 3000 pounds per lineal inch wherein, and wherein the nonwoven fabric has (a) a hydrostatic head from about 140 to about 250 mbar as determined by AATCC™ 127, and (b) a water-vapor-transmission-rate (WVTR) from about 1300 to about 2500 $g/m^2/24$ hour as determined by ASTM E96D.

* * * * *

UNITED STATES PATENT AND TRADEMARK OFFICE
CERTIFICATE OF CORRECTION

| | | |
|---|---|---|
| PATENT NO. | : 12,194,722 B2 | Page 1 of 1 |
| APPLICATION NO. | : 17/093997 | |
| DATED | : January 14, 2025 | |
| INVENTOR(S) | : Lei Wang et al. | |

It is certified that error appears in the above-identified patent and that said Letters Patent is hereby corrected as shown below:

In the Claims

In Column 18, Claim 14, Line 39, "wherein the a first" should read as -- wherein the first --

Signed and Sealed this
Twenty-sixth Day of August, 2025

Coke Morgan Stewart
*Acting Director of the United States Patent and Trademark Office*